United States Patent [19]

Helard et al.

[11] Patent Number: 5,274,629
[45] Date of Patent: Dec. 28, 1993

[54] METHOD FOR THE BROADCASTING OF DIGITAL DATA, NOTABLY FOR RADIO BROADCASTING AT HIGH BIT RATE TOWARDS MOBILE RECEIVERS, WITH TIME-FREQUENCY INTERLACING AND COHERENT DEMODULATION

[75] Inventors: Jean-François Helard; Jean-Michel Lemesle; Roselyne Halbert-Lassalle; Bernard Le Floch, all of Rennes, France

[73] Assignee: Etat Francais and Telediffusion de France SA, France

[21] Appl. No.: 648,899

[22] Filed: Jan. 31, 1991

[30] Foreign Application Priority Data

Feb. 6, 1990 [FR] France ................ 90 01491

[51] Int. Cl.⁵ .............................................. H04J 4/00
[52] U.S. Cl. ........................................ 370/50; 455/59; 375/38
[58] Field of Search ................ 370/50, 70, 23, 95.1, 370/69.1, 102, 100, 19, 20; 455/33, 11, 12, 59; 379/60, 59; 375/38, 45, 58, 1; 380/36, 38, 32; 342/99, 104, 105, 106, 107, 128; 371/43, 45

[56] References Cited

U.S. PATENT DOCUMENTS

| | | | |
|---|---|---|---|
| 4,551,580 | 11/1985 | Cox et al. ............... | 380/36 |
| 4,601,045 | 7/1986 | Lubarsky ................ | 375/38 |
| 4,879,711 | 11/1989 | Rosen .................... | 370/50 |
| 4,881,241 | 11/1989 | Pommier et al. ........ | 375/38 |
| 4,881,245 | 11/1989 | Walker et al. .......... | 375/38 |
| 4,922,483 | 5/1990 | Kobayashi ............. | 370/50 |

Primary Examiner—Douglas W. Olms
Assistant Examiner—Dang Ton
Attorney, Agent, or Firm—Locke Reynolds

[57] ABSTRACT

A method for the broadcasting of digital data, intended to be received notably by mobile receivers moving about in an urban environment, that is, under conditions of multiple propagation and in the presence of parasites and jamming, enabling a coherent demodulation under such conditions of reception. This method is one for the broadcasting of digital data, notably for radio broadcasting at a high bit rate towards mobile receivers, of the type providing for the distribution of the data in the form of digital elements in the frequency-time space f-t and the transmission of symbols each constituted by a multiplex of N orthogonal carrier frequencies modulated by a set of digital elements and broadcast simultaneously, certain of the digital elements being reference elements with a value and position in the frequency-time space f-t that are known to the receivers.

6 Claims, 4 Drawing Sheets

METHOD FOR THE BROADCASTING OF DIGITAL DATA, NOTABLY FOR RADIO BROADCASTING AT HIGH BIT RATE TOWARDS MOBILE RECEIVERS, WITH TIME-FREQUENCY INTERLACING AND COHERENT DEMODULATION

BACKGROUND OF THE INVENTION

1. Field of the Invention

The field of the invention is that of the broadcasting of digital data intended to be received notably by mobile receivers in an urban environment, that is, under conditions of multiple propagation (Rayleigh Process) generating phenomena of fading, and in the presence of parasites and jamming.

The invention can be applied more particularly, but not exclusively, to the system of digital sound broadcasting known as the COFDM (Coding Orthogonal Frequency Division Multiplex) as described in the U.S. Pat. No. 4,881,241 of the present applicants.

This system of digital broadcasting is based on the combined use of a channel coding device and a method of modulation by orthogonal frequency division multiplexing.

2. Description of the Prior Art

The modulation method proper of this prior art system makes it possible to resolve the problems related to the frequency selectivity of the channel. It consists in providing for the distribution of the constituent digital elements of the data signal in the frequency time space f-t, and in simultaneously transmitting sets of digital elements on N parallel broadcasting channels by means of a multiplex of frequencies using orthogonal carriers. In particular, this type of modulation makes it possible to prevent two successive elements of the data train from being transmitted at the same frequency.

The known encoding method seeks, on the whole, to enable the processing of the samples coming from the demodulator to absorb the effect of variations in amplitude of the received signal, due to the RAYLEIGH process. The encoding is advantageously a convolutional encoding, possibly concatenated with a REED-SOLOMON type of encoding. The decoding may advantageously be a soft decision type of Viterbi decoding.

In a known way, the encoded digital elements are additionally interlaced, in time and in frequency, so as to maximize the statistical independence of the channels with regard to the Rayleigh process and to the selective character of the channel.

The demodulation of the received signal may be differential or coherent.

It is known that coherent demodulation theoretically offers greater resistance to noise than differential demodulation, making it possible to obtain a gain in performance of about 3 dB. However, it clearly appears that, under the specific reception conditions of the method, it is particularly difficult to extract a phase and amplitude reference from the modulated signal for each carrier of the multiplex. In the case of coherent demodulation, therefore, the error made in the estimation of the carrier leads to a substantial deterioration in performance characteristics. This is especially true in the case of deep and fast fading encounted when the carrier frequency or the speed of the vehicle increases.

Differential demodulation constitutes another approach, the essential usefulness of which lies in its simplicity of implementation and its absence of inertia after deep fading. It is therefore this second approach that has been used to validate the general principles of the COFDM system, at the cost of a deterioration in performance characteristics of about 3 dB as compared with coherent demodulation.

SUMMARY OF THE INVENTION

The invention is aimed at overcoming these drawbacks and at demonstrating that there exists, however, an elegant possibility of implementing coherent demodulation.

More precisely, the invention is aimed at providing a method of digital broadcasting with time-frequency interlacing enabling a coherent demodulation, in facilitating the extraction of phase and amplitude references.

Another aim of the invention is to restrict the losses in transmission capacity of a method such as this.

This aims, as well as others which shall appear here below, are achieved by a method for the broadcasting of digital data, notably for radio broadcasting at a high bit rate towards mobile receivers, of the type providing for the distribution of said data in the form of digital elements in the frequency-time space f-t and the transmission of frames of symbols each constituted by a multiplex of N orthogonal carrier frequencies modulated by a set of digital elements and broadcast simultaneously, certain of said digital elements being reference elements with a value and position in said frequency-time space f-t that are known to the receivers.

Thus it is possible, by interpolation, to determine a phase and amplitude reference for each of the digital elements, and hence to achieve a coherent demodulation.

To carry out an efficient interpolation, there must be a sufficient number of reference elements available.

Advantageously, these reference elements are distributed in the frequency space in such a way that the frequency distance $\Delta F$ between two of said reference elements is smaller than or equal to $1/(2.T_m)$, $T_m$ being the maximum value of the spread of the pulse response of the transmission channel, and are distributed in the temporal space in such a way that the temporal distance $\Delta T$ between two of said reference elements is smaller than or equal to $1/(2.f_{max})$, $f_{max}$ being the maximum Doppler frequency determined according to the equation $f_{max} = f_o \cdot v/c$ where:

$f_o$ is the maximum carrier frequency, v is the maximum speed of movement of said mobile receivers, c is the velocity of light.

These elements may be placed in any way in the time-frequency space. However, they will preferably be positioned so that they are equidistributed in the frequency time space f-t, for example quincunxially in said frequency time space f-t in relation to the frequency dimension and/or to the temporal dimension.

The invention also concerns receivers capable of using this method.

Advantageously, receivers such as this includes means for the analysis of said reference elements so as to determine, by interpolation, the response of the transmission channel in phase and/or in amplitude for each of said digital elements.

According to an advantageous embodiment, said means of analysis include:

first means for the storage of data before interpolation filtering, means for interpolation filtering along the frequency axis, second means for the storage of the results of said filtering along the frequency axis, means for interpolation filtering along the temporal axis, for each of said carrier frequencies.

Preferably, said means of interpolation filtering along the frequency axis include a finite pulse response filter and said means of interpolation filtering along the temporal axis include a battery of N finite pulse response filters, working independently on each of said N carrier frequencies.

These receivers may then advantageously include means of coherent demodulation, by the projection of the carriers modulated by said digital elements, this projection being done on the results given by said means of analysis.

BRIEF DESCRIPTION OF THE DRAWINGS

Other characteristics and advantages of the invention will appear from the following description of a preferred embodiment of the invention, given as an exemplary and non-restrictive illustration, and from the appended drawings, of which.

The different aspects of the embodiment that shall be described hereinafter more particularly concern digital sound radio-broadcasting towards mobile receivers.

However, it is clear that the principle of digital broadcasting with a high bit rate, according to the invention, can be applied to any type of communication, notably in channels subjected to the Rayleigh process.

DETAILED DESCRIPTION OF THE INVENTION

One goal in the application of digital sound radio broadcasting may be, for example, the transmission of sixteen stereophonic programs in an 8 MHz wide frequency band with a digital bit rate of the order of 250 kbits with compression by stereophonic program.

Figure 1:
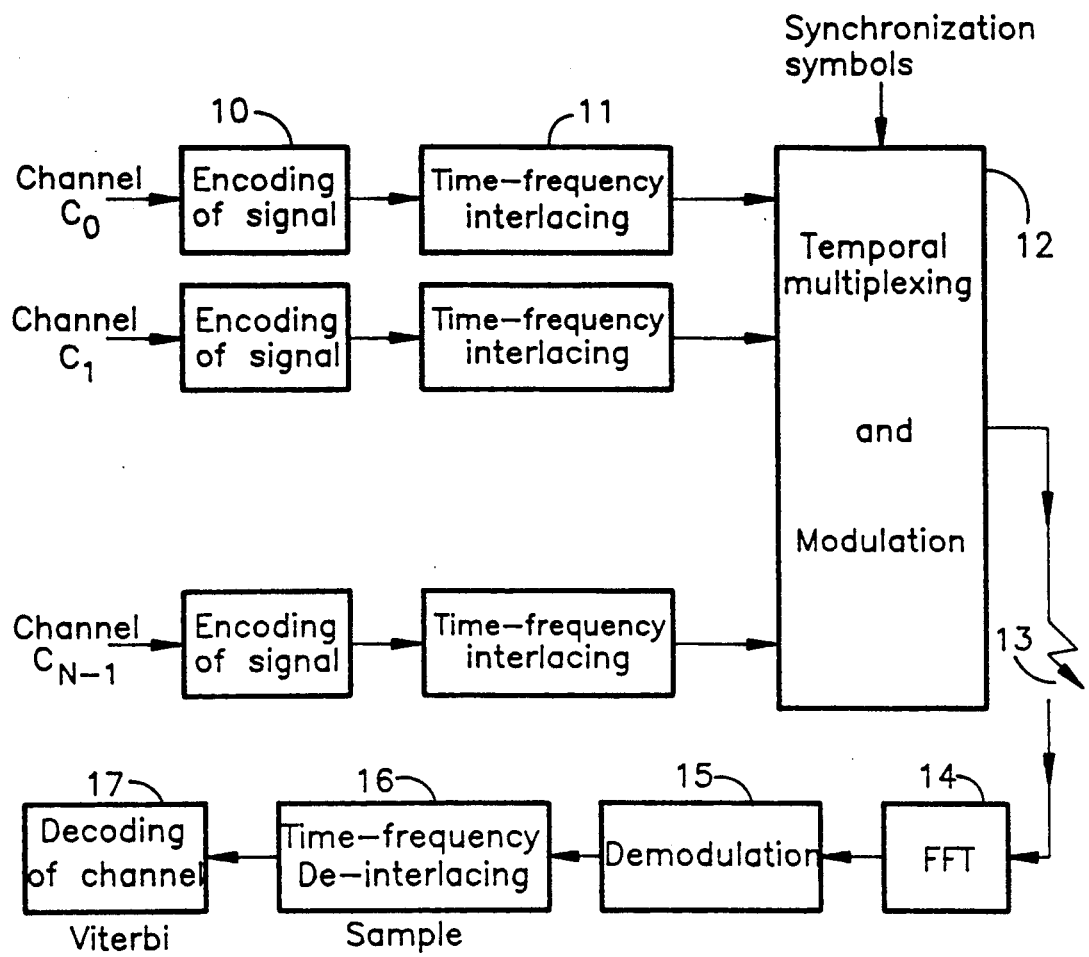
FIG. 1 is a block diagram of a transmission/reception channel implementing the method of the invention.

A transmission chain, such as the one described in the patent application described in the introduction, is shown in FIG. 1.

Each of the N (16) channels $C_0$ to $C_{n-1}$ undergoes an encoding 10 in parallel, then a time-frequency interlacing 11 on a separate channel, before being subjected collectively to a process 12 of time-division multiplexing and OFDM modulation.

The encoding 10 is advantageously of the convolutional type. The time-frequency interlacing 11 is aimed at shuffling the digital elements of each channel in order to give them maximum independence from parasite signals and jamming of the broadcasting channel 13.

The OFDM modulation consists in the modulation of symbols each formed by a multiplex of orthogonal frequencies broadcast simultaneously on N channels. This operation can be achieved by a Fourier transform on the encoded and interlaced digital sequence of each channel $C_i$.

For example, in an 8 MHz frequency band, 512 separate carrier frequencies of 15 625 Hz can be defined. Of these, 448 can be used after elimination of the central frequency of the spectrum and of the side carriers ($\frac{1}{8}$th of the spectrum) to take the filtering constraints into account.

The reception chain comprises the standard steps of filtering and transposition into baseband 14, demodulation 15, frequency de-interlacing 16 and decoding 17 of the de-interlaced channel, advantageously of the Viterbi soft decision decoding type.

The transmitted signal is formed by a sequence of modulation signals forming a multiplex of N orthogonal carriers.

Let $\{f_k\}$ be the set of carrier frequencies considered, with:

$$f_k = f_0 + k/t_s, k = 0 \text{ to } N-1$$

where $t_s$ represents the duration allocated to a modulation symbol.

The following base of elementary signals can then be defined:

$$\Psi_{j,k}(t) \text{ with } k=0 \text{ to } N-1, j = -\infty \text{ to } +\infty:$$

$$\Psi_{j,k}(t) = g_k(t - jT_s)$$

with:

$0 \leq t \leq T_s : g_k(t) = e^{2i\pi f_k t}$ otherwise $: g_k(t) = 0$

Furthermore, let us take a set of complex numbers $\{C_{j,k}\}$ taking its values in a finite alphabet, representing the transmitted data signal.

The associated OFDM signal can then be written as follows:

$$x(t) = Re\left( \sum_{j=-\infty}^{+\infty} \sum_{k=0}^{N-1} C_{j,k} \Psi_{j,k}(t) \right)$$

To resolve every problem of frequency selectivity of the channel, a guard interval with a duration $\Delta$ is inserted before each signal $\psi_{j,k}(t)$, in order to absorb inter-symbol jamming.

$t_s$ therefore represents the duration of the useful signal, $\Delta$, the duration of the guard interval and $T_s = t_s + \Delta$, the duration of the symbol.

The transmission channel may be modelled by the relationship:

$$Y_{j,k} = H_{j,k} C_{j,k} + N_{j,k}$$

where $H_{j,k}$ is the response of the channel at the frequency $f_k$ and the instant $jT_s$ $N_{j,k}$ is a complex Gaussian noise.

The carrier recovery device used in coherent demodulation should be capable of providing an estimation of the response of the channel at any instant and for all the carrier frequencies, in the form:

$$H_{j,k} = \psi_{j,k}\, e^{i p_{j,k}}$$

where:

$\phi_{j,k}$ is the amplitude of the response of the channel, $p_{j,k}$ is the phase of the response of the channel.

The basic idea of the invention consists in the use of certain carriers, carefully distributed in the time-frequency domain as phase and/or amplitude reference pilot frequencies.

This means that fixed words are inserted among the data to be transmitted and at fixed locations, acting as reception amplitude and/or phase references.

Figure 2:
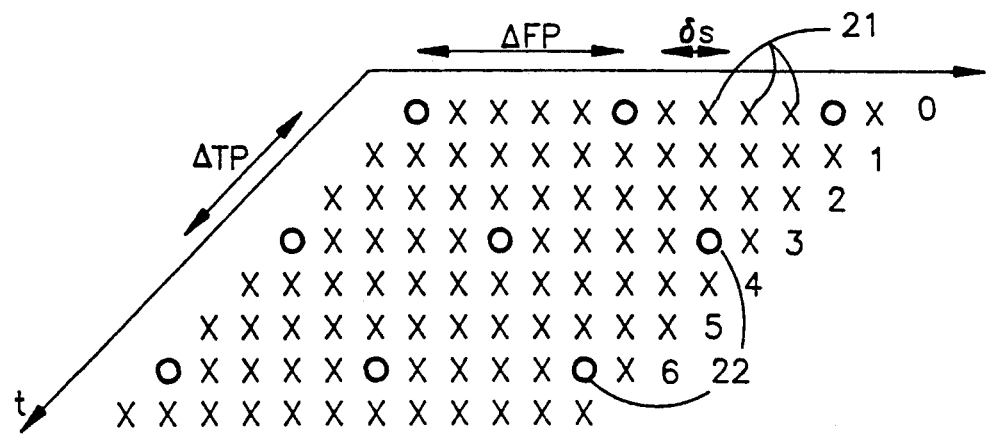
FIG. 2 shows the multiplex of carrier frequencies in the time-frequency domain, comprising reference elements and information elements.

FIG. 2 illustrates an example of the distribution of these pilot frequencies in the time-frequency domain. Reference elements 22 are introduced among the information elements 21, with positions in the time-frequency domain and with values that are known to the receivers, enabling the estimation of the response of the channel.

This may subsequently be obtained at any instant $jT_s$ and for all frequencies $f_k$ by interpolation filtering if the location between the pilot frequencies take account of the characteristics of the transmission multipath transmission environment.

The first characteristic of this environment is the variation in frequency of the transfer function of the channel. It is known that the frequential coherence band $(\Delta f)_c$ is directly determined by the converse of the spreading of the pulse response of the channel Tm:

$$(\Delta f)_c \approx 1/Tm.$$

It is therefore possible to obtain a good estimation of the response of the channel at all the frequencies $f_k$ if the distance $\Delta F$ between two pilot frequencies verifies the following relationship:

$$\Delta F \leq (\Delta f)_c/2.$$

The second characteristic of the transmission environment is the temporal variation of the transfer function of the channel. The temporal coherence $(\Delta t)_c$ of the channel may be given by:

$$(\Delta t)_c \approx 1/f_{max}$$

where $f_{max}$ is the maximum Doppler frequency determined by:

$$f_{max} = f_0 \cdot (v/C)$$

with $f_0$: maximum carrier frequency
v: maximum speed of the vehicle
c: velocity of light Thus, there will be a good estimation of the response of the channel at all the instants $jT_s$ if the reference symbols appear with a periodicity $\Delta T$ such that:

$$\Delta T \leq 1/(2F_{max}) = (\Delta t)_c/2.$$

The function of interpolation that enables these estimations to be obtained may notably be achieved by finite pulse response digital filtering techniques. However, all known filtering techniques may be envisaged including, for example, recursive filtering.

Initially, this interpolation filtering is done along the frequency axis, on each of the symbols bearing reference samples, i.e. in the example of FIG. 2, on the lines 0, 3, 6 . . .

Figure 3:
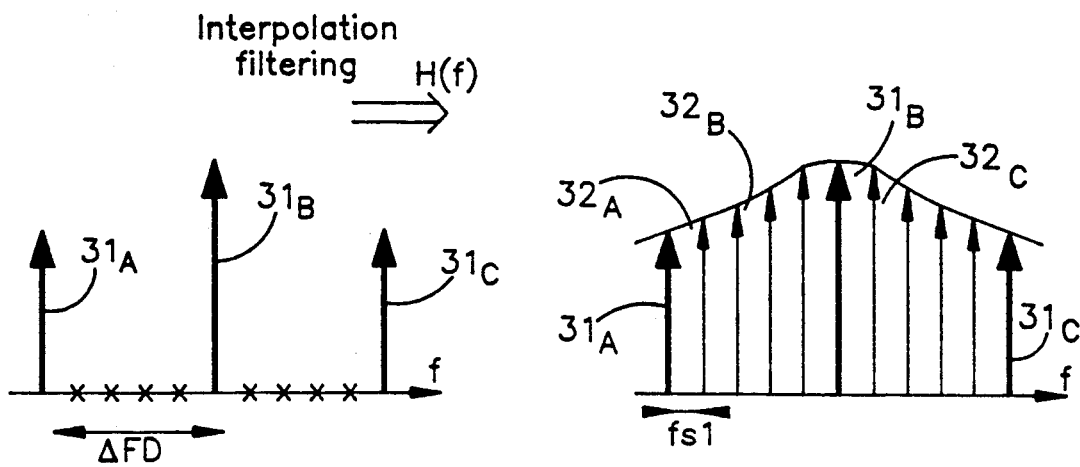
FIG. 3 illustrates the working of the interpolation filtering, according to the invention, on the frequency axis.

FIG. 3 shows the principle of reconstruction by interpolation of the response of the channel. By means of the reference samples received, $31_A$, $31_B$, $31_C$, which correspond to the transmission of an identical reference word, and are spaced out by $\Delta F$, a finite pulse response transfer function filter H(f) enables the reconstitution of the missing samples $32_A$, $32_B$, $32_C$, . . . distant from fs1, by interpolation.

To this end, the transfer function filter H(t) should have a sampling frequency $fs_1$ equal to $(1/t_s)$. The number of coefficients Q of this filter should, furthermore, verify the relationship: $Q >> (\Delta F/fs_1)$.

In a second stage, a second interpolation filtering using the above results is carried out, on the temporal axis, for each frequency.

This filtering is done by a battery of N filters in parallel, each working independently on a frequency fk.

Figure 4:
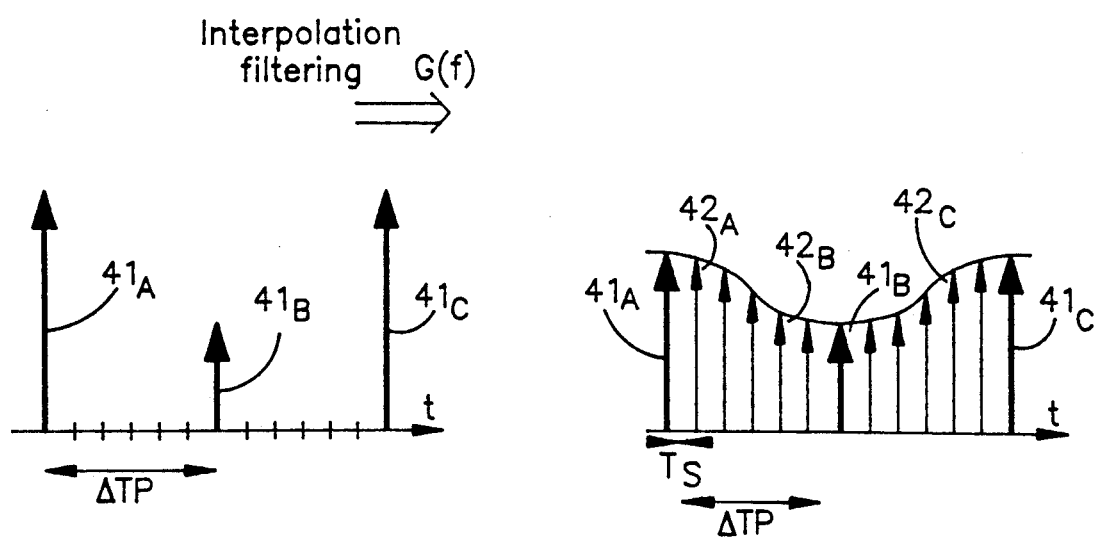
FIG. 4 illustrates the working of the interpolation filtering according to the invention on the temporal axis.

FIG. 4 illustrates this interpolation in the temporal domain. Through the finite pulse response transfer function filter G(F), the reference samples received $41_A$, $41_B$, $41_C$ enables the determining of the missing samples $42_A$, $42_B$, $42_C$ . . . spaced out by $T_s$.

The sampling frequency of each of the transfer function G(F) function filters should be:

$$fs_2 = (1/T_s)$$

and their number P of coefficients should verify:

$$P >> (\Delta T/T_s).$$

Figure 5:
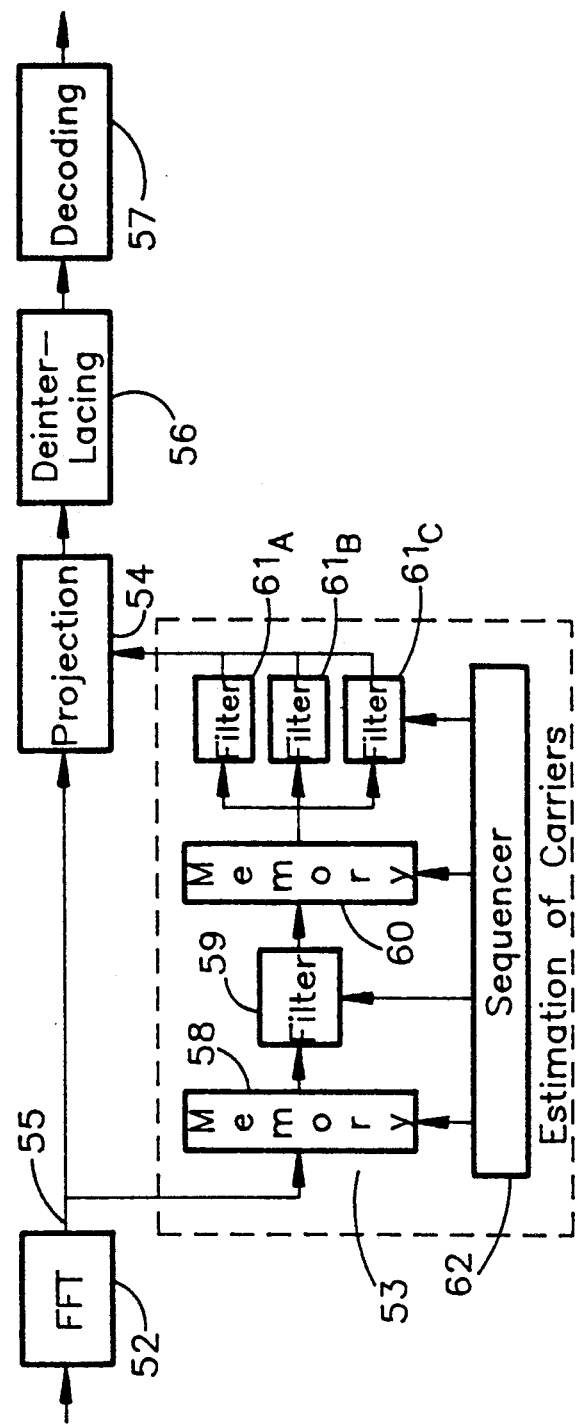
FIG. 5 shows an exemplary embodiment of the module for the estimation of carriers according to the invention.

FIG. 5 shows an embodiment of the module of estimation of the carriers according to the invention.

The pieces of data 51, coming from the frequency de-interlacing module 52, which advantageously carries out a Fourier transform, are directed firstly towards a module 53 for the estimation of carriers and, secondly, towards a module 54 for projection on the references.

By means of the estimation of the carriers 55, this module 54 carries out a coherent demodulation of the data 51. After demodulation, the receiver carries out operations for de-interlacing 56 and decoding 57.

In a particular embodiment, the estimation of the carriers can be achieved as follows: the pieces of data 51 are stored in a memory 58. When the desired number of pieces of data is available in memory, a first filtering operation 59 is carried out along the frequency axis. The pieces of data coming from this filtering operation are stored in a second memory 60, then filtered along the temporal axis. This temporal filtering is carried out by N independent filters $61_A$, $61_B$, $61_C$. . . , each acting on a carrier frequency.

These different modules 58, 59, 60, $61_A$, $61_B$, $61_C$ are piloted by a sequencer 62 which provides for the proper synchronization of the operations.

This example of an embodiment does not restrict the scope of the invention. Many other possibilities will be perceived by those skilled in the art. In particular, it is possible to carry out, firstly, the temporal filtering and then the frequency filtering.

Figure 6A:
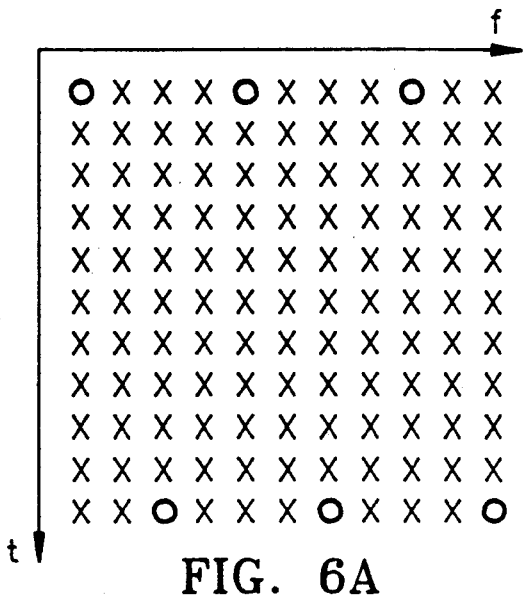
FIGS. 6A, 6B and 6C illustrate different modes for the setting up of the reference elements.
Figure 6B:
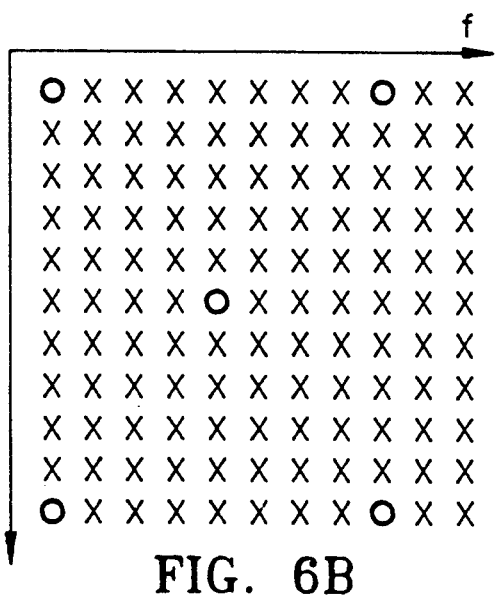
Figure 6C:
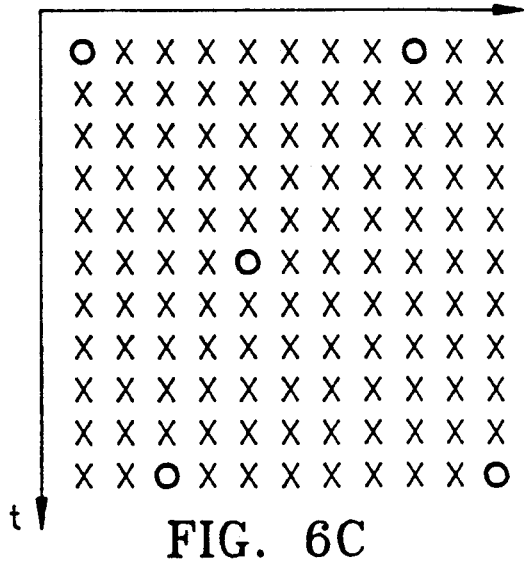

Advantageously, the reference elements are positioned regularly. FIGS. 6A, 6B and 6C illustrate different possibilities of arrangement. FIG. 6A shows the case of a quincunxial arrangement in relation to the frequencies, FIG. 6A shows a quincunxial arrangement in relation to time and FIG. 6C shows a quincunxial arrangement in relation to the two dimensions.

As an example of an application, we give here below the characteristics of the method of the invention, in the case of the COFDM modulation as presently defined.

The number of carriers of the multiplex is N=448. Each symbol has a length $T_s=80$ μs and hence has a useful duration of $t_s=64$ μs. The distance between the carriers fs is therefore 15 625 Hz.

If we consider a spreading of the pulse response of the channel Tm=8 μs, corresponding to the extreme case of a distance of 2.5 km between a signal and its simple echo, the frequency coherence band $(\Delta F)_c$ is equal to 125 kHz. The distance between two reference elements should therefore be such that $\Delta Fp \leq 62.5$ kHz.

One reference for every four carriers therefore makes it possible to obtain efficient interpolation on the frequency axis.

With a center frequency $f_0$ of 1 GHz and a speed of the vehicle of 100 km/h, the maximum Doppler frequency $f_{max}$ is about 100 Hz. The temporal coherence band of the channel $(\Delta f)_c$ being 10 ms, we deduce the following therefrom:

$$\Delta TP \leq 5 \text{ ms}$$

In choosing, for example, $\Delta TP=0.8$ ms, we need one reference at every ten symbols:

$$\frac{\Delta Tp}{T_s} = \frac{800}{80} = 10$$

In this case, the reference elements therefore occupy only one fortieth of the resource: this amounts to a relatively low loss.

What is claimed is:

1. A receiver of a digital signal transmitted in a transmission channel on a plurality of orthogonal frequency carriers, said digital signal being formed of data elements grouped in symbols comprising first symbols and second symbols, at least two of said first symbols being inserted between any two of said second symbols, said first symbols consisting entirely of N of said data elements and second symbols comprising N-P of said data elements and P reference elements, said reference elements being regularly distributed among said data elements in such a way that at least two consecutive data elements are inserted between each two reference elements, each of said symbols being transmitted on N orthogonal frequency carriers for simultaneous broadcast;

the receiver comprising:

means for recovering said reference elements and for estimating a response of the transmission channel consisting in a demodulation sample for each of said frequency carriers of said plurality of orthogonal frequency carriers, from the recovered reference elements, said means for recovering comprising:

first means for interpolation filtering of the reference elements of a second symbol to recover demodulation reference samples for each data elements of said second symbol;

second means for interpolation filtering of the recovered demodulation reference samples of said second symbols, on each of said frequency carriers for a set of successive data elements included between two successive second symbols to recover demodulation reference samples for each data elements of each of said first symbols;

means for projecting each of the frequency carriers of said plurality of orthogonal frequency carriers on the corresponding demodulation sample of the estimated response of the transmission channel, carrying out a coherent demodulation of each of said frequency carriers.

2. A receiver according to claim 1, wherein said first means for interpolation filtering include a finite pulse response filter.

3. A receiver according to claim 1, wherein said second means for interpolation filtering include a battery of finite pulse response filters, each finite pulse response filter working independently on a distinct frequency carrier of said plurality of orthogonal frequency carriers.

4. A method of broadcasting in a transmission channel and receiving in a mobile receiver a digital source signal, the method comprising the steps of:

forming a series of useful data elements representative of said digital source signal;

supplying reference elements to aid in coherent demodulation, said reference elements having a value known by said receiver;

providing for N orthogonal frequency carriers to be simultaneously broadcast;

forming first symbols consisting entirely of N of said data elements;

forming second symbols comprising N-P of said data elements and P reference elements, said reference elements being regularly distributed among said data elements in such a way that at least two consecutive data elements are inserted between each two reference elements;

forming a series of symbols comprising first symbols and second symbols, at least two of said first symbols being inserted between each two of said second symbols;

broadcasting said series of symbols, the broadcasting of a symbol consisting of simultaneously modulating and broadcasting each of said frequency carriers with a distinct element of said symbol;

receiving said series of symbols;

recovering said reference elements of said second symbols;

estimating a demodulation reference sample for each of said data elements of said symbols from recovered demodulation reference samples, comprising the steps of:

first interpolation filtering of the reference elements of a second symbol to recover demodulation reference samples for each of the data elements of said second symbol;

second interpolation filtering of the recovered demodulation reference samples of said second symbols on each of said frequency carriers for a set of successive data elements included between two successive second symbols to recover demodulation reference samples for each data elements of each of said first symbols;

projecting each of said frequency carriers of each of said symbols on the corresponding demodulation reference samples to carry out a coherent demodulation of said frequency carriers, said reference elements of any one of said second symbols being separated from adjacent reference elements by a frequency $\Delta F$ smaller than or equal to $1/(2T_m)$, $T_m$ being the maximum value of the spread of the pulse response of the transmission channel, and said second symbols being separated from adjacent second symbols by a period $\Delta T$ smaller than or equal to $1/(2f_{max})$, $f_{max}$ being the maximum Doppler frequency determined according to the equation:

$$f_{max} = f_0 v/c$$

where:
$f_0$ is the maximum carrier frequency,
v is the maximum speed of movement of said mobile receiver,
c is the velocity of light.

5. A method according to claim 4, wherein said step of forming second symbols comprises the step of:
alternately forming second symbols of a first type having P reference elements and second symbols of a second type having P reference elements, the reference elements of the second symbols of the first type affecting distinct frequency carriers from the reference elements of the second symbols of the second type.

6. A method according to claim 4, wherein said step of forming second symbols comprises the step of:
alternately forming second symbols of a first type having P reference elements, second symbols of a second type having P reference elements, second symbols of a third type having P reference elements, and second symbols of a forth type having P reference elements, the reference elements of the second symbols of each type affecting distinct frequency carriers from the reference elements of the second symbols of the other types.

* * * * *